(12) United States Patent
Herndon et al.

(10) Patent No.: US 6,608,734 B1
(45) Date of Patent: Aug. 19, 2003

(54) STATOR RING MASS/STIFFENER FOR IMPROVED ACOUSTICS

(75) Inventors: Troy M. Herndon, San Jose, CA (US); Jeffry A. LeBlanc, Aptos, CA (US); Robert A. Nottingham, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 50 days.

(21) Appl. No.: 09/863,551

(22) Filed: May 23, 2001

Related U.S. Application Data
(60) Provisional application No. 60/273,003, filed on Mar. 1, 2001.

(51) Int. Cl.$^7$ .............................................. G11B 17/02
(52) U.S. Cl. .................................................. 360/99.08
(58) Field of Search ......................... 360/99.08, 99.04, 360/98.07; 310/194

(56) References Cited

U.S. PATENT DOCUMENTS

| | | | |
|---|---|---|---|
| 4,068,142 A | * 1/1978 | Gillet et al. ................ 310/194 |
| 4,965,476 A | * 10/1990 | Lin ........................... 360/99.08 |
| 5,579,188 A | 11/1996 | Dunfield et al. ......... 360/99.08 |
| 5,590,003 A | 12/1996 | Dunfield et al. ......... 360/98.07 |
| 5,694,268 A | 12/1997 | Dunfield et al. ......... 360/98.07 |

* cited by examiner

Primary Examiner—Robert S. Tupper
(74) Attorney, Agent, or Firm—Moser, Patterson & Sheridan, LLP

(57) ABSTRACT

A disc drive spindle motor having improved acoustic properties for use in a disc drive data storage system is provided. In one embodiment, the disc drive spindle motor a base, a stationary member, a rotor and a stator. A bearing interconnects the rotor with the stationary member and allows the rotor to rotate about the stationary member. The stator includes a plurality of teeth extending from a back iron. At least one stiffening member is coupled to the stator, joining the teeth at an end opposite the back iron. The stiffening member substantially reduces vibrations in the stator thereby reducing acoustic noise generated by the motor.

24 Claims, 6 Drawing Sheets

STATOR RING MASS/STIFFENER FOR IMPROVED ACOUSTICS

This application claims benefit of U.S. Provisional Application No. 60/273,003, entitled STATOR RING MASS/STIFFENER FOR IMPROVED ACOUSTICS, filed Mar. 1, 2001 by Herndon et al., which is hereby incorporated by reference in its entirety.

FIELD OF THE INVENTION

The invention relates to the field of stator assemblies of the type used in concert with high-speed spindle elements. More specifically, the invention relates to stator assemblies utilized in a disc drive system.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside a hub that supports the discs. One type of motor in common use is known as an in-hub or in-spindle motor. Such in-spindle motors typically have a spindle mounted by means of two ball or hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the spindle to rotate, thereby rotating the disc and passing the information storage tracks beneath the head.

As the coils on the stator are sequentially energized to generate the rotational force, the stators begin to vibrate. Additionally, tolerance stacks across the drive components result in gaps therebetween in a direction along the spindle axis. The energization of the coils produces a solenoid effect in this direction that causes the drive components to move in response to the motor switching, thereby creating an axial vibration. When the resonant frequency of these components, including the stator, is near the switching frequency of the motor, there is little damping of vibrations. Such vibrations, whether in the form of structural mechanical resonances or the forced response of a thin surface member, tend to produce acoustic noise that is irritating to many users and conveys the appearance of an inferiorly constructed unit.

Thus, the problem presented is to minimize the vibrations and noise contribution produced by the stator during motor operation.

SUMMARY OF THE INVENTION

In one aspect of the invention, a disc drive spindle motor having improved acoustic properties is provided. In one embodiment, the disc drive spindle motor includes a base, a stationary member, a rotor and a stator. A bearing interconnects the rotor with the stationary member and allows the rotor to rotate about the stationary member. The stator includes a plurality of teeth supported from a stationary support member. The teeth have a plurality of coils wound thereover. At least one stiffening member is coupled to the stator, joining the teeth at an end opposite the stationary support member. The stiffening member substantially reduces and/or tunes vibrations in the stator thereby reducing acoustic noise generated by the motor.

In another aspect of the invention, a disc drive storage system having a stiffened stator is provided. In one embodiment, the disc drive storage system generally includes a housing, a stator, a rotatable member and at least one data storage disc that is coaxially attached to the rotatable member. The housing includes a base that has a stationary member attached thereto. The stationary member is coaxial with a central axis of the base. The rotatable member is interface by a bearing with the stationary member. The stator, also coaxial with the rotatable member, includes a plurality of teeth extending from an annular support member. At least a first annular stiffening member is bonded between the ends of the teeth which minimizes and/or tunes the vibration and acoustic noise contribution of the stator during the system's operation.

While the invention is useful in disc drive spindle motors having ball bearings, the invention is particularly useful in hydrodynamic bearing motors to reduce or eliminate pure vibration tones that become more noticeable with lower levels of background vibration. Additionally, the invention may be used to tune the frequency of the stator away from excitation frequencies of other components of the motor. The stiffened stator can have an axial position that is within or below the hub, and can have a radial position that is internal or external to the rotor. The mass of the stiffening member may be tuned to shift the frequency of the stator away from frequencies of other drive components.

BRIEF DESCRIPTION OF THE DRAWINGS

The teachings of the invention can be readily understood by considering the following detailed description in conjunction with the accompanying drawings, in which.

DETAILED DESCRIPTION OF THE PREFERRED EMBODIMENTS

Figure 1:
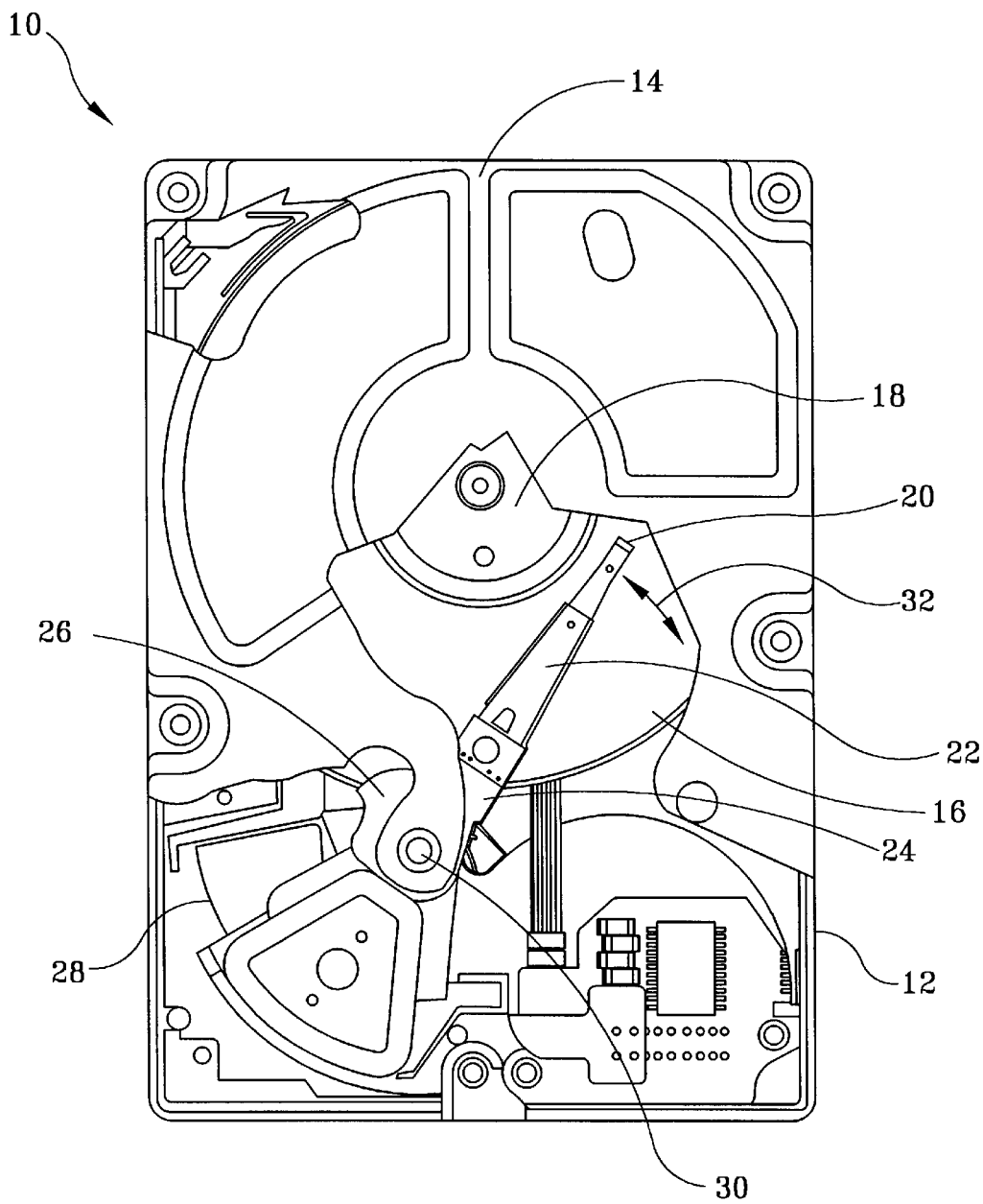
FIG. 1 is a top plan view of a disc drive data storage device, in accordance with the invention.

The invention comprises a spindle motor for a disc drive data storage device wherein the stator is stiffened and/or tuned to reduce acoustic levels in the storage device. FIG. 1 is a plan view of a typical disc drive 10 wherein the invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing. For example, disc drives have been manufactured using a vertical split between two housing members. In such drives, that portion of the housing half that connects to the lower end of the spindle motor is analogous to base 12, while the opposite side of the same housing member, that is connected to or adjacent the top of the spindle motor, is functionally the same as the top cover 14.

Disc drive 10 further includes a disc pack 16 that is mounted for rotation on a spindle motor (not shown) by a disc clamp 18. Disc pack 16 includes a plurality of individual discs that are mounted for co-rotation about a central axis. Each disc surface has an associated head 20 that is mounted to disc drive 10 for communicating with the disc surface. In the example shown in FIG. 1, heads 20 are supported by flexures 22 that are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the invention is also useful in disc drives having other types of actuators, such as linear actuators.

Figure 2:
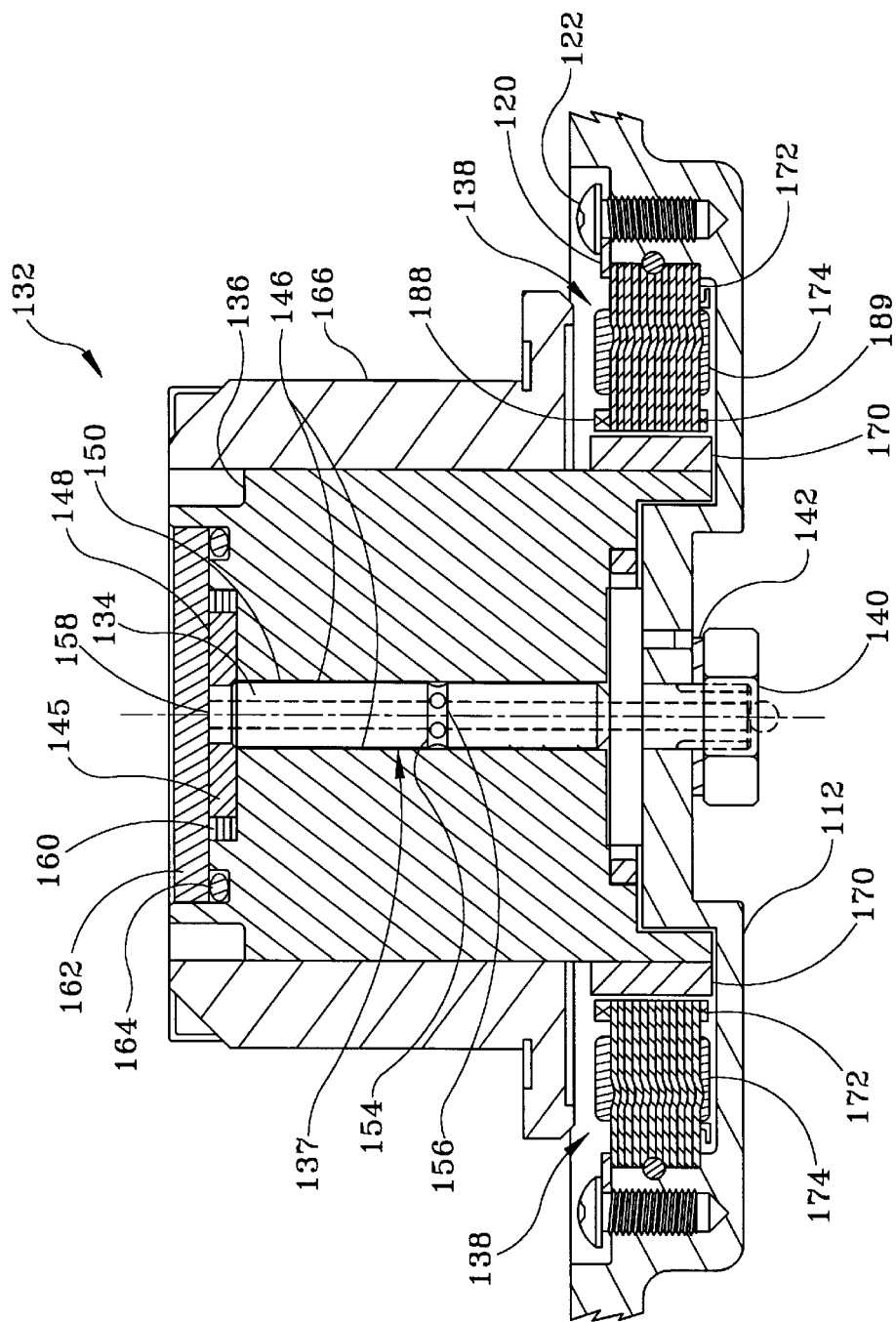
FIG. 2 is a sectional view of an isolated hydrodynamic bearing spindle motor in accordance with the invention.

FIG. 2 is a sectional view of a hydrodynamic bearing spindle motor 132 in accordance with the invention. Spindle motor 132 includes a stationary member (shaft) 134, a hub 136 and a stator 138. In the embodiment shown in FIG. 2, the shaft is fixed and attached to base 112 through a nut 140 and a washer 142. The hub 136 is supported by the shaft 134 through a hydrodynamic bearing 137 for rotation about shaft 134. The bearing 137 includes a radial working surface 146 and axial working surfaces 148 and 150. The shaft 134 includes fluid ports 154, 156 and 158 that supply hydrodynamic fluid 160 and assist in circulating the fluid along the working surfaces of the bearing.

The spindle motor 132 further includes a thrust bearing 145 that forms the axial working surfaces 148 and 150 of hydrodynamic bearing 137. A counterplate 162 cooperates with the working surface 148 to provide axial stability for the hydrodynamic bearing and to position the hub 136 within the spindle motor 132. An o-ring 164 is provided between the counterplate 162 and the hub 136 to seal the hydrodynamic bearing 137. The o-ring 164 prevents hydrodynamic fluid 160 from escaping between the counterplate 162 and the hub 136. If an o-ring is not used, then the counterplate may be laser welded to the hub in order to seal the hydrodynamic bearing. The present invention is useful with this and other forms of hydrodynamic bearings and is not limited to use with this particular configuration.

The hub 136 includes a disc carrier member 166 that supports disc pack 16 (shown in FIG. 1) for rotation about shaft 134. The disc pack 16 is held on disc carrier member 166 by the disc clamp 18 (also shown in FIG. 1). A plurality of permanent magnets 170 are attached to the outer diameter of the hub 136, with the hub 136 and magnets 170 acting as a rotor for the spindle motor 132.

The stator 138 is generally formed of a stack of stator laminations 172 and associated stator windings 174. The stator 138 is generally retained in the base 112 by fasteners, adhesives or other conventional methods. In the embodiment illustrated in FIG. 2, the stator 138 is disposed in a pocket formed in the base 112. A tab 120 is fastened by a screw 122 to the base 112 and includes a portion that overlies the stator 138 thus retaining the stator 138 in the pocket of the base 112. In accordance with the invention, the stator 138 is stiffened by at least a first stiffening member 188 coupled thereto. Optionally, one or more additional stiffening members such as a second stiffening member 189 may also be coupled to the stator 138.

Figure 3:
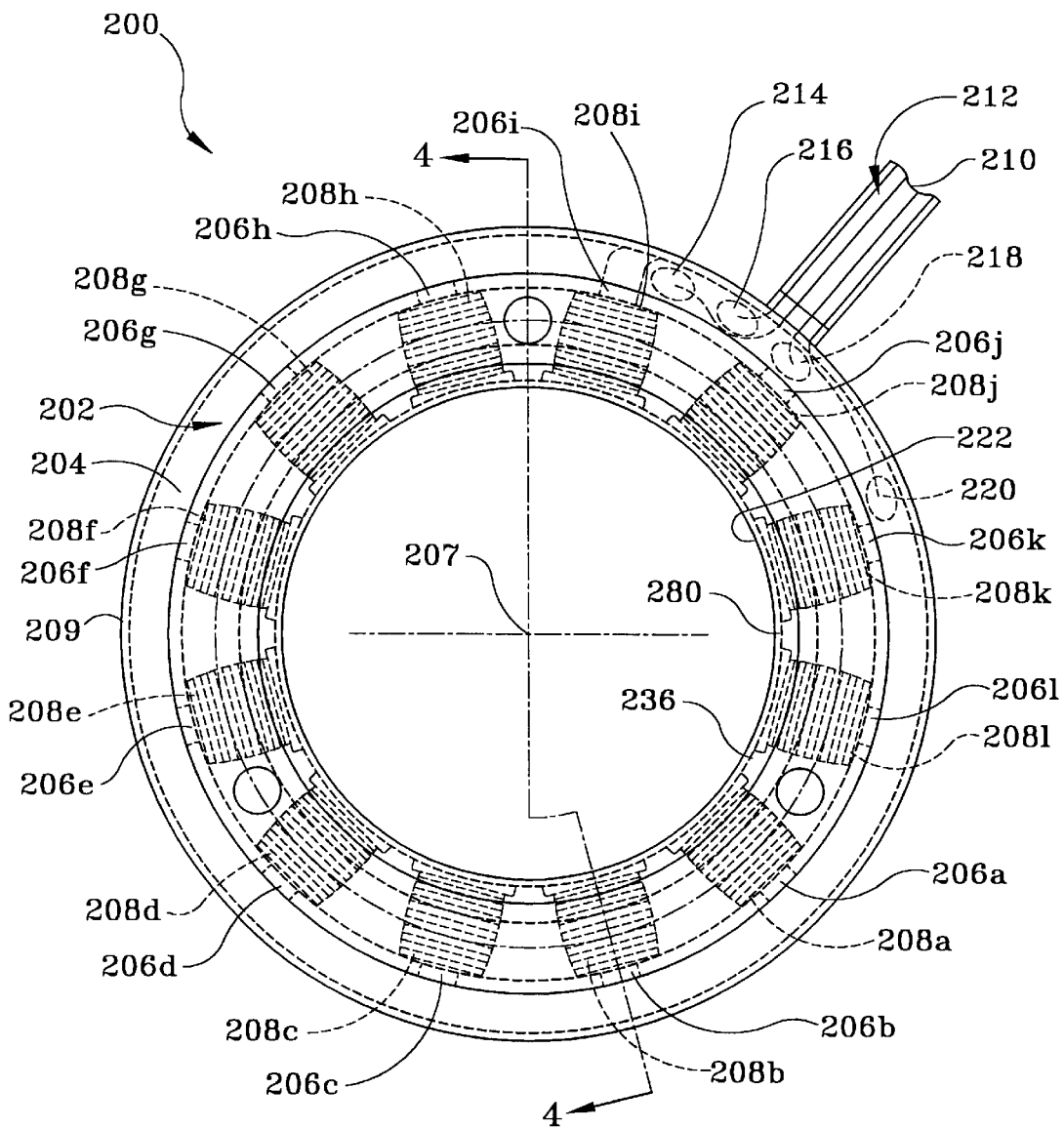
FIG. 3 is a plan view of one embodiment of a stator in accordance with the invention.
Figure 4:
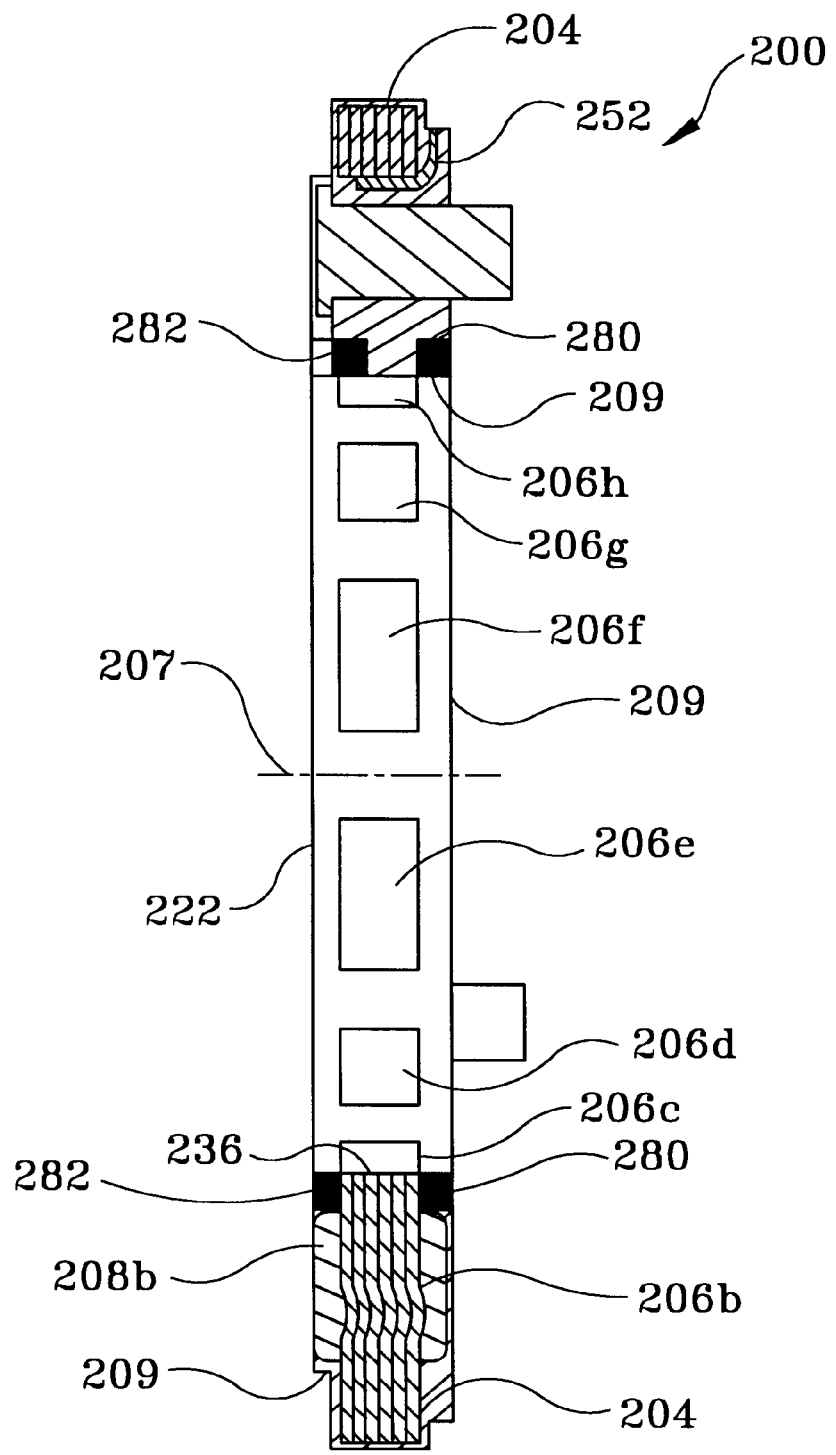
FIG. 4 is a sectional view of the stator shown in FIG. 3, taken along lines 4—4.

FIG. 3 is a plan view of one embodiment of a stator 200 having at least a first stiffening member 280 bonded thereto. FIG. 4 is a sectional view of the stator 200, taken along lines 4—4 of FIG. 3. The stator 200 includes a stator lamination 202 comprising an annular support member 204 and a plurality of teeth 206a–206l, that extend inward from the support member 204 toward a central axis 207. The teeth 206a–206l are disposed about an inner diameter 222 of the stator 200. A plurality of phase windings 208a–208l are wound on the stator teeth 206a–206l, respectively, for magnetic communication with an internal rotor (not shown). The phase windings 208a–208l can have a number of winding configurations. Some examples of phase windings that may benefit from the invention are discussed in U.S. patent Ser. No. 08/469,643, entitled IRONLESS HYDRODYNAMIC SPINDLE MOTOR, filed Jun. 6, 1995 by Dunfield et al., and in U.S. patent Ser. No. 08/400,661, entitled HYDRODYNAMIC SPINDLE MOTOR HAVING DISTRIBUTED WINDINGS, filed Mar. 8, 1995 by Dunfield et al., both of which are commonly assigned and are hereby incorporated by reference in their entireties.

A flexible printed circuit (FPC) 210 carries a plurality of conductors 212 that are electrically connected to start and finish winding terminations 214, 216, 218 and 220. The terminations 214, 216, 218 and 220 are electrically connected to the phase windings 208a–208l in a conventional manner.

The support member 204, stator teeth 206a–206l and windings 208a–208l may optionally include an overmold 209. The overmold 209 is generally a resilient rubber-like or plastic-like material that dampens the vibrational energy of the stator 200. Each of the stator lamination teeth 206a–206l remain exposed at an end 236 of the teeth 206a–206l defined along inner diameter 222 for close communication with the rotor. Generally, overmolded stators can have a number of configurations. One example of an overmolded stator that may benefit from the invention is described in U.S. Pat. No. 5,694,268, entitled SPINDLE MOTOR HAVING OVERMOLDED STATOR, issued Dec. 2, 1997 to Dunfield et al., which is hereby incorporated by reference in its entirety.

The first stiffening member 280 is generally adhered between two or more of the teeth 206a–206l adjacent the ends 236. The first stiffening member 280 may be a ring or a segment thereof, and in one embodiment is bonded to each of the teeth 206a–206l. The first stiffening member 280 substantially prevents relative movement between the individual teeth 206a–206l, thereby substantially eliminating the resonance modes of the individual teeth 206a–206l. In stators 200 incorporating an overmold, the first stiffening member 280 is generally disposed between the overmold 209 and the end 236 of the teeth 206a–206l or be optionally encapsulated in the overmold 209.

The first stiffening member 280 may be fabricated from a variety of substantially rigid materials or composites suitable for mechanically coupling the teeth 206a–206l of the stator 200. As the teeth 206a–206l coupled by the first stiffening member 280 vibrate in unison along the central axis 207 in what is known as an umbrella mode, the mass of the first stiffening member 280 (along with any other stiffening members utilized) should be selected to shift (e.g., tune) the umbrella mode away from any motor excitation frequencies. Thus, the rigidity of stiffening member 280 substantially prevents the vibration of the teeth 206a–206l relative each other unlike the overmold 209 that absorbs vibration between the teeth 206a–206l. Since the frequency of a member (such as the stator 200) is a function of the square root of the stiffness divided by the mass, adding mass to the first stiffening member 280 will shift the umbrella mode of the stator 200 to a lower frequency. Accordingly, the mass of the stiffening member 280 (including any other stiffening members) may be selected to move the umbrella mode away from other know excitation frequencies of other motor or drive components.

The profile of the first stiffening member 280 may be selected to enhance rigidity and should include sufficient surface area to adequately bond the member 280 to the teeth 206a–206l. In one embodiment, the stiffening member 280 is ring-shaped and has a square or rectangular cross section. While the invention is particularly useful in hydrodynamic bearing motors to reduce pure tone vibrations where the background vibration level is relatively low, the invention is also useful in motors having ball bearings to reduce or eliminate the transfer of vibrations from the stator to the base.

Optionally, a second stiffening member 282 (and other stiffening members when utilized) is typically configured similar to the first stiffening member 280. In the embodiment depicted in FIG. 4, the second stiffening member 282 is adhered to the opposite side of the teeth 206a–206l relative to the first stiffening member 280.

Figure 5:
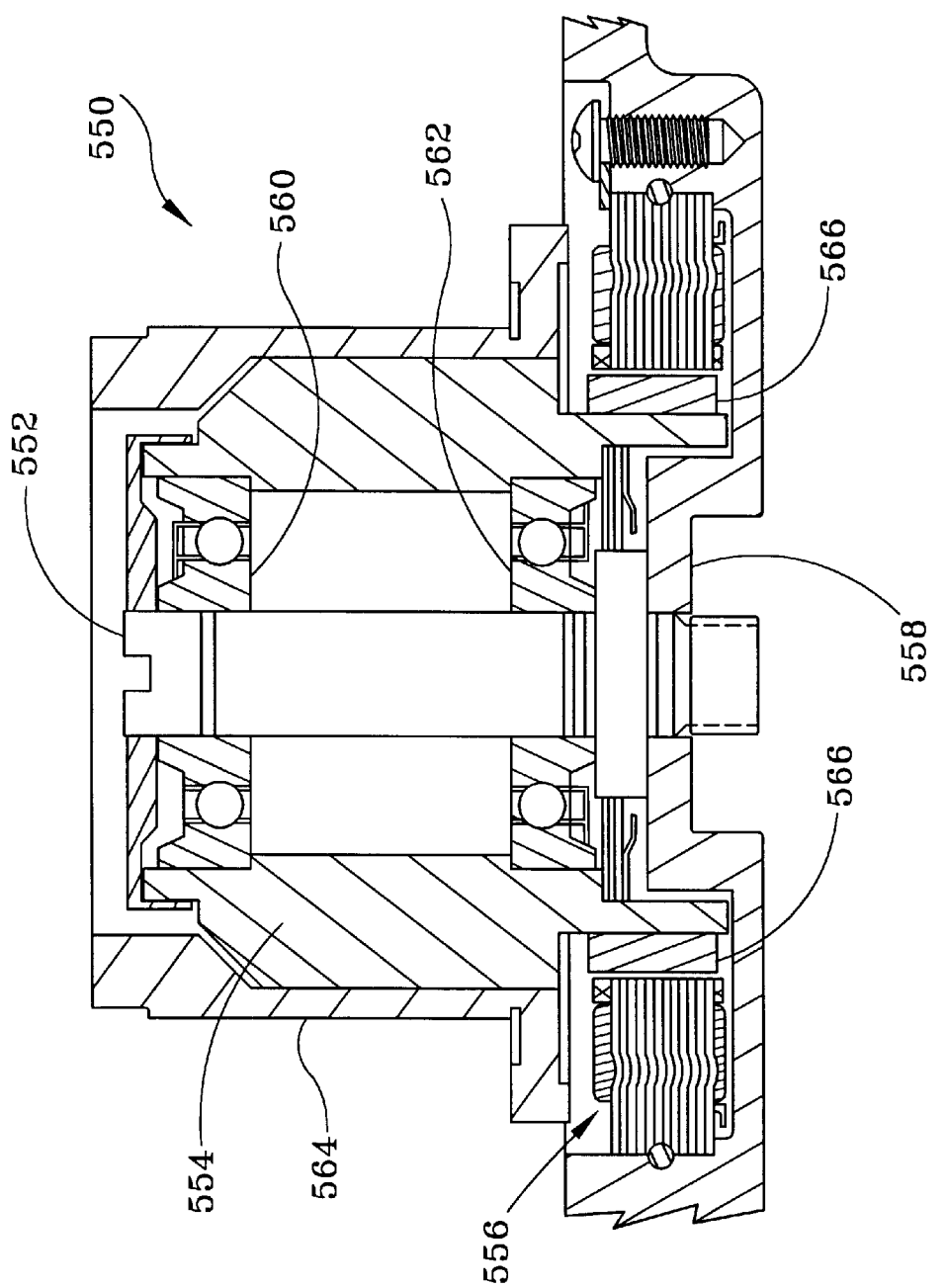
FIG. 5 is a sectional view of a ball bearing spindle motor in accordance with the invention.

FIG. 5 illustrates one embodiment of a spindle motor having ball bearings, as opposed to a hydrodynamic bearing. The spindle motor 550 includes a shaft 552, a hub 554 and a stator 556. The shaft 552 is a stationary shaft that is fixedly attached to a base 558. The shaft 552 is also attached to the inner races of ball bearings 560 and 562. The hub 554 is attached to the outer races of bearings 560 and 562 for rotation about the shaft 552. The hub 554 includes a disc carrying member 564 that carries a plurality of magnetic discs (not shown) for rotation about the shaft 552. The hub 554 also carries a plurality of permanent magnets 566 that form a rotor for the spindle motor 550. As in the embodiments described with reference to FIGS. 2–4, the stator 556 includes one or more stiffening members, for example, a first stiffening member 502 and a second stiffening member 504.

FIGS. 2–5 illustrate embodiments in which the stator is positioned external to the hub such that the stiffening members are positioned along the inner diameter of the stator. However, the stiffening members can also be positioned along the outer diameter of the stator.

Figure 6:
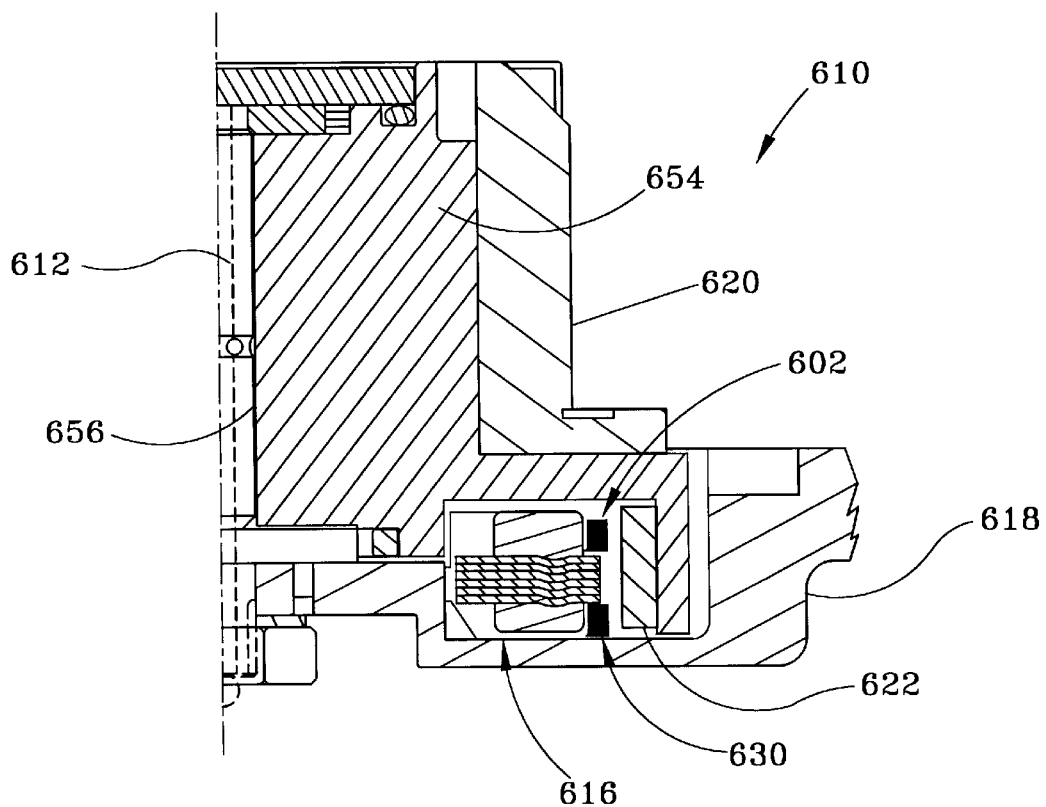
FIG. 6 depicts one embodiment of a spindle motor in accordance with the invention.

FIG. 6 depicts one embodiment of a spindle motor having stiffening members positioned along the outer diameter of the stator. Spindle motor 610 includes a shaft 612, a hub 654 and a stator 616. The shaft 612 is a stationary shaft that is fixedly attached to a base 618. The hub 654 is rotatably disposed on the shaft 612 having a hydrodynamic bearing 656 disposed therebetween. Alternatively, one or more ball bearings may be utilized in lieu of the hydrodynamic bearing 656. The hub 654 includes a disc carrying member 620 that carries a plurality of magnetic discs (not shown) for rotation about the shaft 612. The hub 654 also carries a plurality of permanent magnets 622 that forms a rotor for spindle motor 610. As in the embodiments described with reference to FIGS. 2–4, stator 616 includes one or more stiffening members, for example, a first stiffening member 602 and a second stiffening member 630, for reducing vibration and acoustic noise generation of the motor 610.

Integrating the stiffening members to the stator has several advantages. First, the stiffeners link the individual stator teeth by their ends thereby substantially eliminating the resonances of the individual teeth. Additionally, the mass of the stiffening members may be tuned (i.e., selectively increased or decreased) to move the frequency of the stator away from the motor and drive component's excitation frequencies, thus minimizing the stator's contribution to vibration and acoustic noise generated by the drive.

Although the invention has been described with reference to preferred embodiments, workers skilled in the art will recognize that changes may be made in form and detail without departing from the spirit and scope of the invention. For example, the placement of one or more stiffening members disposed between the teeth of the stator can be configured in a variety of ways and can include a combination of the embodiments discussed above. The embodiments shown in the figures are provided by way of example only. Also, the stiffened stator can be implemented in a variety of stator and base configurations. The stator could be supported directly from the shaft, rather than the base supporting the shaft, and still usefully incorporate the invention. The stiffened stator of the invention can be used in fixed shaft or rotating shaft spindle motors. In a rotating shaft spindle motor, the bearing is located between the rotating shaft and an outer stationary sleeve that is coaxial with the rotating shaft. The stator in such a configuration could be supported either from the base or the interior of the sleeve. The term "base" used herein refers to the base itself or any stationary extension thereof.

What is claimed is:

1. A disc drive spindle motor for rotating at least one disc about a central axis in a storage device, comprising:
    a base;
    a stationary member attached to the base;
    a hub comprising a rotor and a disc carrying member, wherein the hub is rotatable about the central axis with respect to the stationary member;
    a bearing interconnecting the hub with the stationary member;
    a stator coaxial with the rotor and including an annular support member and a plurality of teeth extending from the annular support member to an end; and
    at least one rigid stiffening member coupling the ends of two or more of the teeth and supported by the teeth independent of the base and stationary member of the disc drive.

2. The disc drive spindle motor of claim 1, wherein the stiffening member is bonded to the stator.

3. The disc drive spindle motor of claim 1 further comprising a second stiffening member coupling the ends of the teeth.

4. The disc drive spindle motor of claim 1, wherein the stiffening member has a square or rectangular cross section.

5. The disc drive spindle motor of claim 1, wherein the teeth extend radially inwards from the annular support member.

6. The disc drive spindle motor of claim 1, wherein the teeth extend radially outwards from the annular support member.

7. The disc drive spindle motor of claim 1 wherein the bearing comprises a hydrodynamic bearing.

8. The disc drive spindle motor of claim 1 wherein the bearing comprises a ball bearing.

9. The disc drive spindle motor of claim 1 wherein the stator has an axial position that is below the hub with respect to the central axis.

10. The disc drive spindle motor of claim 1 wherein the stator has a radial position that is internal to the rotor with respect to the central axis.

11. The disc drive spindle motor of claim 1 wherein the stator has a radial position that is external to the rotor with respect to the central axis.

12. The disc drive spindle motor of claim 1, wherein at least a portion of the teeth are overmolded, and the stiffening member is disposed between the overmold and the end of the teeth.

13. The disc drive spindle motor of claim 12, wherein at least a portion of the first stiffening member is encapsulated in an overmold.

14. The disc drive motor spindle of claim 1 wherein the first stiffening member is bonded to each of the teeth of the stator.

15. A disc drive spindle, comprising:
   a base;
   a stationary member attached to the base;
   a hub comprising a rotor and a disc carrying member, wherein the hub is rotatable about the central axis with respect to the stationary member;
   a bearing interconnecting the hub with the stationary member;
   a stator coaxial with the rotor and including an annular support member and a plurality of teeth extending from the annular support member to an end;
   a winding disposed on each of the teeth; and
   a stiffening means coupled between the ends of two or more of the teeth for tuning the teeth against vibration-induced acoustics.

16. The disc drive spindle motor of claim 15, wherein the stiffening means comprises a member is bonded to the stator.

17. The disc drive spindle motor of claim 16 wherein the member is coupled to the ends of the teeth.

18. The disc drive spindle motor of claim 17, wherein at least a portion of the teeth are overmolded, and the member is disposed between the overmold and the end of the teeth.

19. The disc drive spindle motor of claim 17, wherein at least a portion of the first stiffening member is encapsulated in an overmold.

20. A disc drive data storage system, comprising:
   a housing having a base;
   a central axis;
   a stationary member attached to the base and coaxial with the central axis;
   a rotatable member which is rotatable with respect to the stationary member;
   a bearing interconnecting the rotatable member with the stationary member;
   at least one data storage disc attached to and coaxial with the rotatable member;
   a stator coaxial with the rotatable member; the stator including an annular support member and a plurality of teeth extending from the annular support member to an end; and
   at least a first annular stiffening member independent of the base and the stationary members bonded between the ends of at least two or more of the teeth.

21. The disc drive data storage system of claim 20 further comprising a second annular stiffening member bonded between the ends of the teeth.

22. The disc drive data storage system of claim 20, wherein the teeth extend radially inwards or outwards from the annular support member.

23. The disc drive data storage system of claim 20 wherein the bearing comprises a hydrodynamic or ball bearing.

24. The disc drive data storage system of claim 20 wherein the stator has a radial position that is internal or external to the rotor with respect to the central axis.

* * * * *